(12) United States Patent
Yu

(10) Patent No.: US 9,749,101 B2
(45) Date of Patent: Aug. 29, 2017

(54) BASE STATION, METHOD AND SYSTEM FOR REDUCING INTER-CELL INTERFERENCE

(71) Applicant: Chiun Mai Communication Systems, Inc., New Taipei (TW)

(72) Inventor: Chung-Hao Yu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/976,046

(22) Filed: Dec. 21, 2015

(65) Prior Publication Data
US 2016/0352476 A1 Dec. 1, 2016

(30) Foreign Application Priority Data

May 28, 2015 (CN) .......................... 2015 1 0282228
Aug. 20, 2015 (CN) .......................... 2015 1 0513031

(51) Int. Cl.
*H04W 72/08* (2009.01)
*H04L 5/00* (2006.01)

(52) U.S. Cl.
CPC ......... *H04L 5/0032* (2013.01); *H04W 72/082* (2013.01); *H04L 5/00* (2013.01)

(58) Field of Classification Search
CPC ....... H04L 5/0032; H04L 5/00; H04L 5/0073; H04W 72/082

USPC ..... 370/329, 252, 330; 455/452.1, 454, 501, 455/509, 62, 201; 365/198
See application file for complete search history.

(56) References Cited

U.S. PATENT DOCUMENTS

| | | | |
|---|---|---|---|
| 2010/0267408 A1* | 10/2010 | Lee ..................... | H04W 52/243 455/509 |
| 2013/0022010 A1* | 1/2013 | Qianxi ................. | H04L 5/0033 370/329 |
| 2015/0264652 A1* | 9/2015 | Zhang ................. | H04W 52/143 455/522 |
| 2015/0373731 A1* | 12/2015 | Quan .................... | H04W 16/10 370/329 |

FOREIGN PATENT DOCUMENTS

| | | | | |
|---|---|---|---|---|
| EP | 2563083 A1 | 2/2013 | | |
| FR | EP 2563083 | * | 2/2013 | ............ H04W 72/04 |

\* cited by examiner

*Primary Examiner* — Inder Mehra
(74) *Attorney, Agent, or Firm* — Steven Reiss

(57) ABSTRACT

A base station for reducing inter-cell interference, including: at least one processor; and a non-transitory storage device storing one or more programs which, when executed by the at least one processor, cause the at least one processor to: detect low interference indicators (LIIs), wherein the LIIs comprising low interference physic resource blocks (PRBs); and allocate the low interference PRBs in the LIIs that are not used by user equipment UE of a cell served by the base station (served cell) to cell edge UE of the served cell.

9 Claims, 11 Drawing Sheets

HII bit map

| PRBs | PRB1 | PRB2 | PRB3 | PRB4 | PRB5 |
|---|---|---|---|---|---|
| value | 1 | 0 | 1 | 0 | 0 |

FIG. 2

ULII bit map

| PRBs | PRB1 | PRB2 | PRB3 | PRB4 | PRB5 |
|------|------|------|------|------|------|
| value | 0 | 0 | 0 | 0 | 1 |

FIG. 4

RNTP bit map

| PRBs | PRB1 | PRB2 | PRB3 | PRB4 | PRB5 |
|------|------|------|------|------|------|
| Value | 1 | 0 | 0 | 0 | 0 |

FIG. 8

DLII bit map

| PRBs | PRB1 | PRB2 | PRB3 | PRB4 | PRB5 |
|---|---|---|---|---|---|
| Value | 0 | 1 | 0 | 0 | 0 |

FIG. 10

BASE STATION, METHOD AND SYSTEM FOR REDUCING INTER-CELL INTERFERENCE

CROSS-REFERENCE TO RELATED APPLICATIONS

This application claims priority to Chinese Patent Application No. 201510282228.9 filed on May 28, 2015, and Chinese Patent Application No. 201510513031.1 filed on Aug. 20, 2015, the contents of which are incorporated by reference herein.

FIELD

The subject matter herein generally relates to wireless communication technology, and particularly to a base station, method and system for reducing inter-cell interference.

BACKGROUND

Inter-cell interference is an important issue which impacts signal quality between base stations (BS) and user equipment (UE), especially for UE at an edge of a cell.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 2 illustrates one embodiment of a bit map of the high interference indicator of FIG. 1 in the conventional art.

FIG. 4 illustrates one embodiment of a bit map of the low interference indicator of FIG. 3.

FIG. 8 illustrates one embodiment of a bit map of the relative narrowband transmission power of FIG. 7 in the conventional art.

FIG. 10 illustrates one embodiment of a bit map of the low interference indicator of FIG. 9.

DETAILED DESCRIPTION

Figure 1:
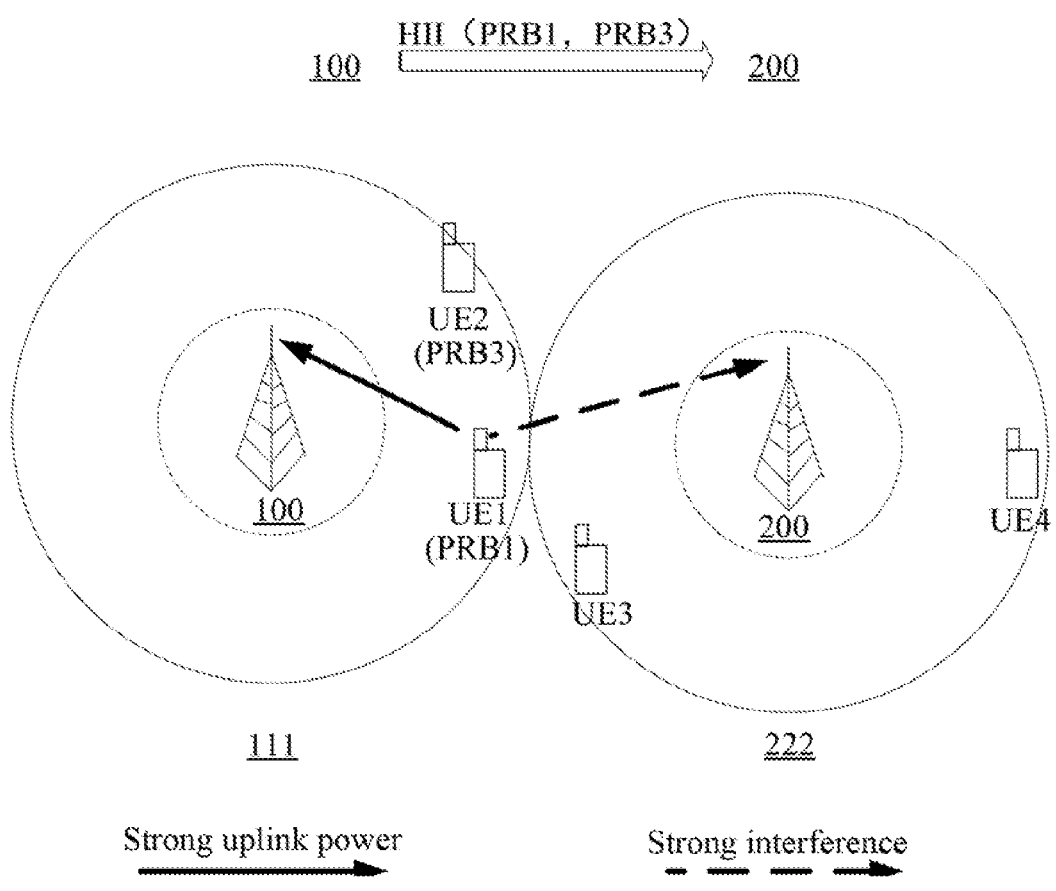
FIG. 1 illustrates one embodiment of usage of a high interference indicator for uplink transmission in the conventional art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The disclosure, referring to the accompanying drawings, is illustrated by way of examples and not by way of limitation. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "of, but not necessarily limited to"; it specifically indicates open-ended inclusion or membership in a so-described combination, group, series and the like.

FIG. 1 illustrates one embodiment of usage of a high interference indicator for uplink transmission in the conventional art. In at least one embodiment as shown in FIG. 1, in Third Generation Partnership Project Long Term Evolution (3GPP LTE), evolved Node B can be called as base station (BS). Messages can be exchanged with base stations via an X2 interface (not shown in FIG. 1). In some embodiments, the X2 interface can be a communication interface for data and signal communication between the base stations. The exchanged messages include physical resource blocks (hereinafter referred to PRBs) used by user equipment (hereinafter referred to UE). A PRB is a basic unit of spectrum allocation and time slot allocation to UE.

In some embodiments, LTE can define a high interference indicator (hereinafter referred to as HII) and an overload indicator (hereinafter referred to as OI) to prevent inter-cell interference for uplink transmission. When a BS allocates PRBs to edge user equipment (EUE), the BS transmits a HII to its neighboring BSs via the X2 interface. The HII means that the PRBs used by EUEs of a cell may produce high interference to the usage of the same PRBs by the EUEs of a neighboring cell. When the neighboring BSs receive the HII, to prevent degradation of throughputs, the neighboring BSs avoid allocating the PRBs which are allocated to the EUE of the BS to the EUE of the neighboring BSs.

As shown in FIG. 1, a first base station 100 can transmit a HII to a second base station 200 via the X2 interface. In some embodiments, a first cell 111 can be served by the first base station 100, a second cell 222 can be served by the second base station 200. UE in the first cell 111 or in the second cell 222 can be divided into two groups, for example, cell center user equipment (hereinafter referred to as CUE) and cell edge user equipment (hereinafter referred to as EUE) according to a predetermined rule. The predetermined rule can be a path loss from a base station, or a sending power of UE, or a reference signal received power reported by UE.

In at least one embodiment, there can be UE1 and UE2 in the first cell 111. The UE1 and UE2 can be EUE determined by the first base station 100 according to the reference signal received power. In some embodiments, each of the UE1 and UE2 can be a cellular telephone, an access terminal, personal digital assistant, a laptop or any other communication terminal.

In at least one embodiment, the first base station 100 can established a communication with the UE1 and allocate PRB1 to the UE1 according to a request for uplink transmission from the UE1. The first base station 100 can established a communication with the UE2 and allocate PRB3 to the UE2 according to a request for uplink transmission from the UE2. The first base station 100 can transmit a HII to neighboring BSs, for example, the second base station 200. The HII indicates levels of interference imposed by the PRBs allocated by the first base station 100 on the second base station 200. In some embodiments, the levels of interference imposed by the first base station 100 on the second base station 200 can be transmitted in a form of a bit map. In at least one embodiment as shown in FIG. 2, the levels of interference can be indicated by item values in a list of the HII information, for example, 1 and 0, which respectively represents high interference and low interference. That is to say, the item value 1 indicates that the corresponding PRB in the HII is a high interference PRB, while the item value 0 indicates that the corresponding PRB in the HII is a low interference PRB. The high interference PRBs in the HII are the PRBs that are allocated to the EUE of the first cell 111 by the first base station 100 for uplink transmission. In some embodiments, the first base station 100 updates the HII information periodically.

Take an example, the first base station 100 allocates PRB1, PRB2, PRB3, PRB4 and PRB5 to the UE of the first cell 111. PRB1 is used by UE1, PRB3 is used by UE2. The item values of PRB1 and PRB3 in the HII are 1 which indicate that the PRB1 and PRB3 are high interference PRBs in the HII. The item values of PRB2, PRB4 and PRB5 in the HII are 0 which indicate that the PRB2, PRB4 and PRB5 are low interference PRBs in the HII. When the second base station 200 receives the HII from the first base station 100, the second base station 200 prevents allocating PRB1 and PRB3 to EUE (e.g. UE3 and UE4 in FIG. 1) of the second cell 222.

Figure 3:
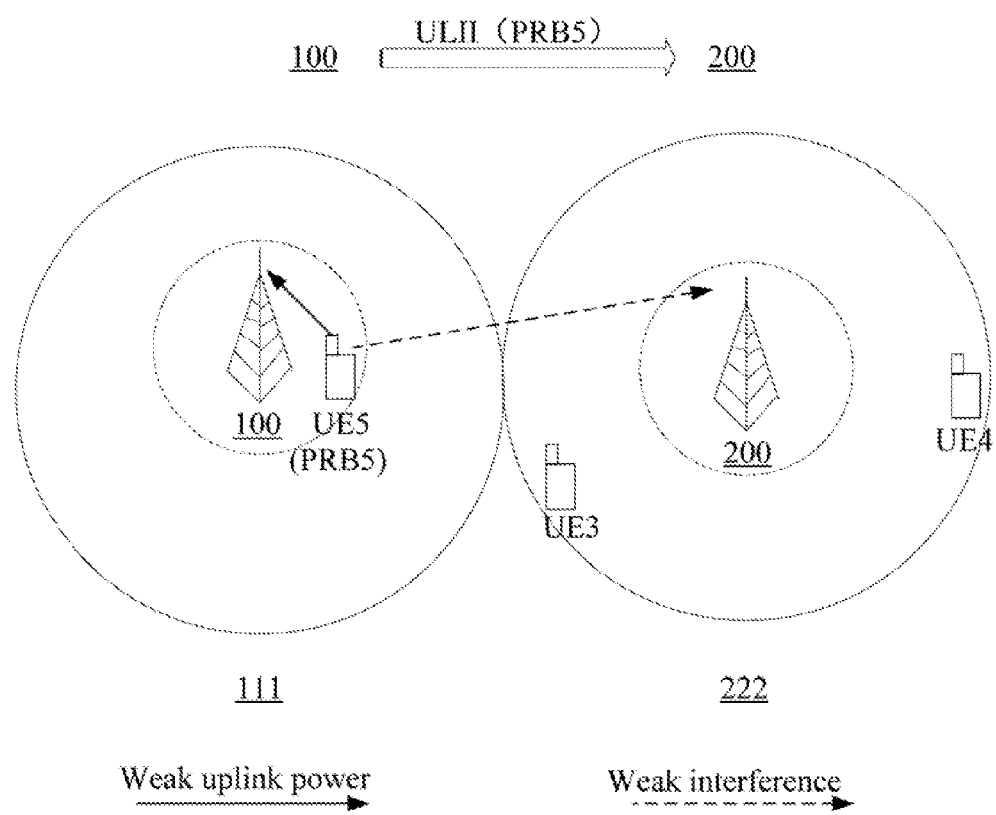
FIG. 3 illustrates one embodiment of usage of a low interference indicator for uplink transmission.

FIG. 3 illustrates one embodiment of usage of a low interference indicator for uplink transmission.

In at least one embodiment, the first base station 100 can transmit an uplink low interference indicator (hereinafter referred to as ULII) to the second base station 200 via the X2 interface. In some embodiments, a first cell 111 can be served by the first base station 100, a second cell 222 can be served by the second base station 200. UE in the first cell 111 or in the second cell 222 can be divided into two groups, for example, cell center user equipment (hereinafter referred to as CUE) and cell edge user equipment (hereinafter referred to as EUE) according to a predetermined rule. The predetermined rule can be a path loss from a base station, or a sending power of UE, or a reference signal received power reported by UE.

In at least one embodiment, there can be UE5 in the first cell 111. The UE5 can be CUE determined by the first base station 100 according to the reference signal received power. In some embodiments, the UE5 can be a cellular telephone, an access terminal, personal digital assistant, a laptop or any other communication terminal.

In at least one embodiment, the first base station 100 can established a communication with the UE5 and allocate PRB5 to the UE5 according to a request for uplink transmission from the UE5. The first base station 100 can transmit a uplink low interference indicator (hereinafter referred to as ULII) to neighboring BSs, for example, the second base station 200.

In at least one embodiment, the ULII indicates the levels of interference imposed by signal strength of uplink transmission of the CUE and the EUE of the first cell 111 on the UE of the second cell 222. For the CUE of the first cell 111, good channel quality can be easily maintained with weak uplink power due to short distance (low path loss) to the first base station 100. The weak uplink power imposes a low interference on UE of the second cell 222. However, for the EUE of the first cell 111, good channel quality has to be maintained with strong uplink power due to long distance (high path loss) to the first base station 100. Moreover, the EUE of the first cell 111 are closer to the second cell 222 than the CUE of the first cell 111 are. Therefore, the strong uplink power imposes a high interference on UE of the second cell 222. Based on the observation, the CUE of the first cell 111 causes low interference, and the EUE of the first cell 111 causes high interference.

In some embodiments, the ULII from the first base station 100 to the second base station 200 can be transmitted in a form of a bit map. In at least one embodiment as shown in FIG. 4, the levels of interference can be indicated by item values in a list of ULII information, for example, 1 and 0, which respectively represents low interference and high interference. That is to say, the item value 1 indicates that the corresponding PRB in the ULII is a low interference PRB, while the item value 0 indicates that the corresponding PRB in the ULII is a high interference PRB. The low interference PRBs in the ULII are the PRBs that are allocated to the CUE of the first cell 111 by the first base station 100 for uplink transmission. In some embodiments, the first base station 100 updates the ULII information periodically.

Take an example, the first base station 100 allocates PRB1, PRB2, PRB3, PRB4 and PRB5 to the UE of the first cell 111. PRB5 is used by UE5 (a CUE shown in FIG. 3). The item values of PRB1-PRB4 are 0 which indicate that the PRB1-PRB4 are high interference PRBs in the ULII. The item value of PRB5 is 1 which indicates that PRB5 is a low interference PRB in the ULII. When the second base station 200 receives the ULII from the first base station 100, based on the ULII, the second base station 200 may directly allocate PRB5 to EUE (e.g. UE3 or UE4 in FIG. 3) of the second cell 222. The PRB5 allocated to the UE3 or UE4 in the second cell 222 has no impact on the UE5 of the first cell 111.

Figure 5:
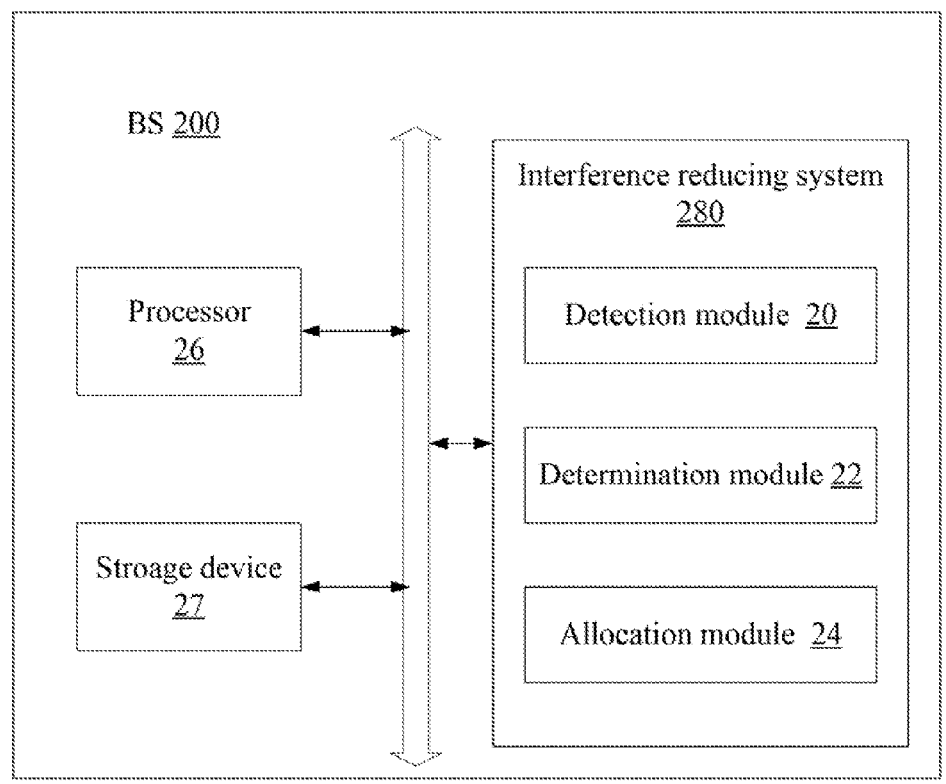
FIG. 5 is a block diagram of one embodiment of function modules of an interference reducing system.

FIG. 5 is a block diagram of one embodiment of function modules of interference reducing system. In at least one embodiment, an interference reducing system 280 can include a detection module 20, a determination module 22, and an allocation module 24. The function modules can include computerized codes in the form of one or more programs, which are stored in the storage device 27 of the second base station 200. The at least one processor 26 of the second base station 200 executes the computerized codes to perform functions of the function modules.

In at least one embodiment, the storage device 27 of the second base station 200 can include various types of non-transitory computer-readable storage medium. For example, the storage device 27 can be an internal storage system, such as a flash memory, a random access memory (RAM) for temporary storage of information, and/or a read-only memory (ROM) for permanent storage of information. The storage device 27 can also be an external storage system, such as a hard disk, a storage card, or a data storage medium.

In at least one embodiment, the at least one processor 26 of the second base station 200 can be a central processing unit (CPU), a microprocessor, or other data processing chip that performs functions of the interference reducing system 280.

Figure 6:
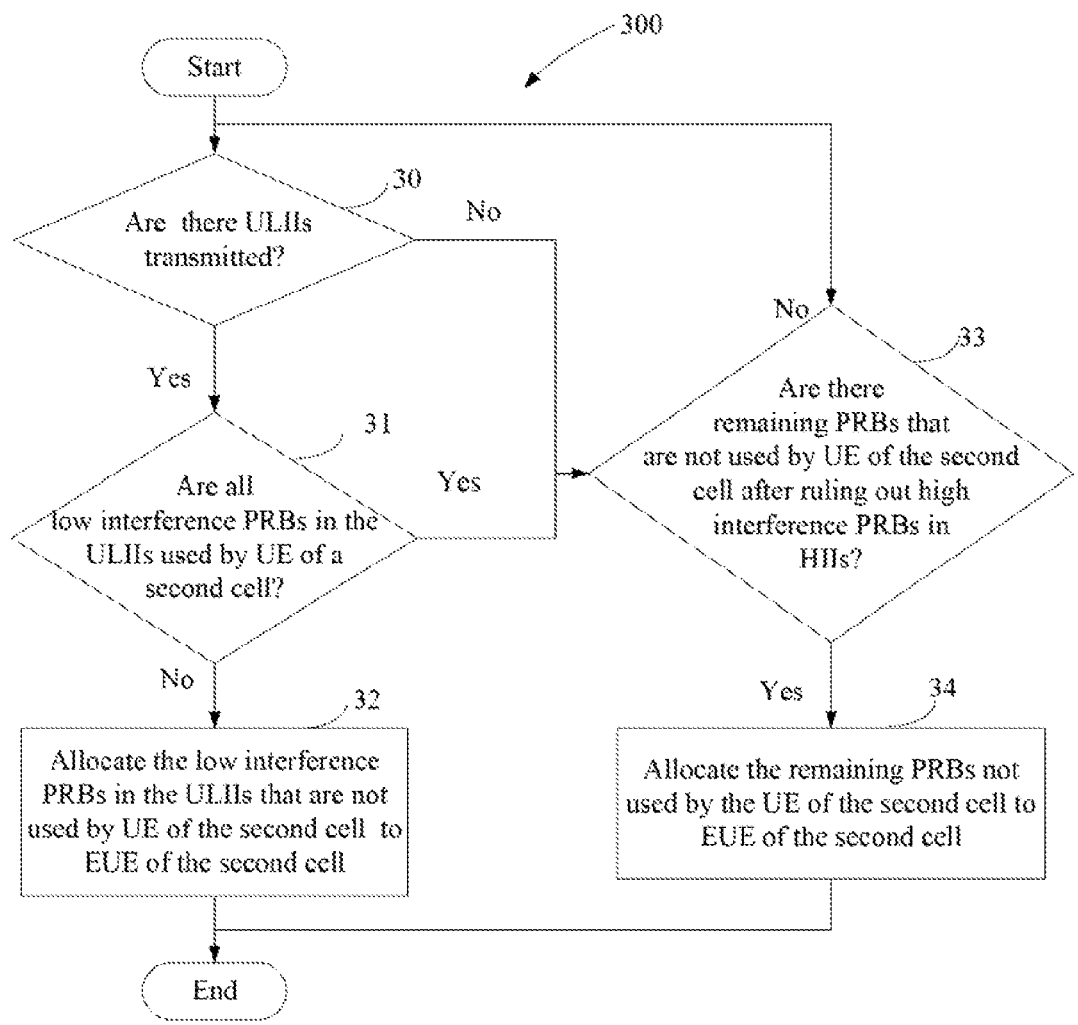
FIG. 6 illustrates a flowchart of one embodiment of a method for reducing inter-cell interference for uplink transmission.
Figure 11:
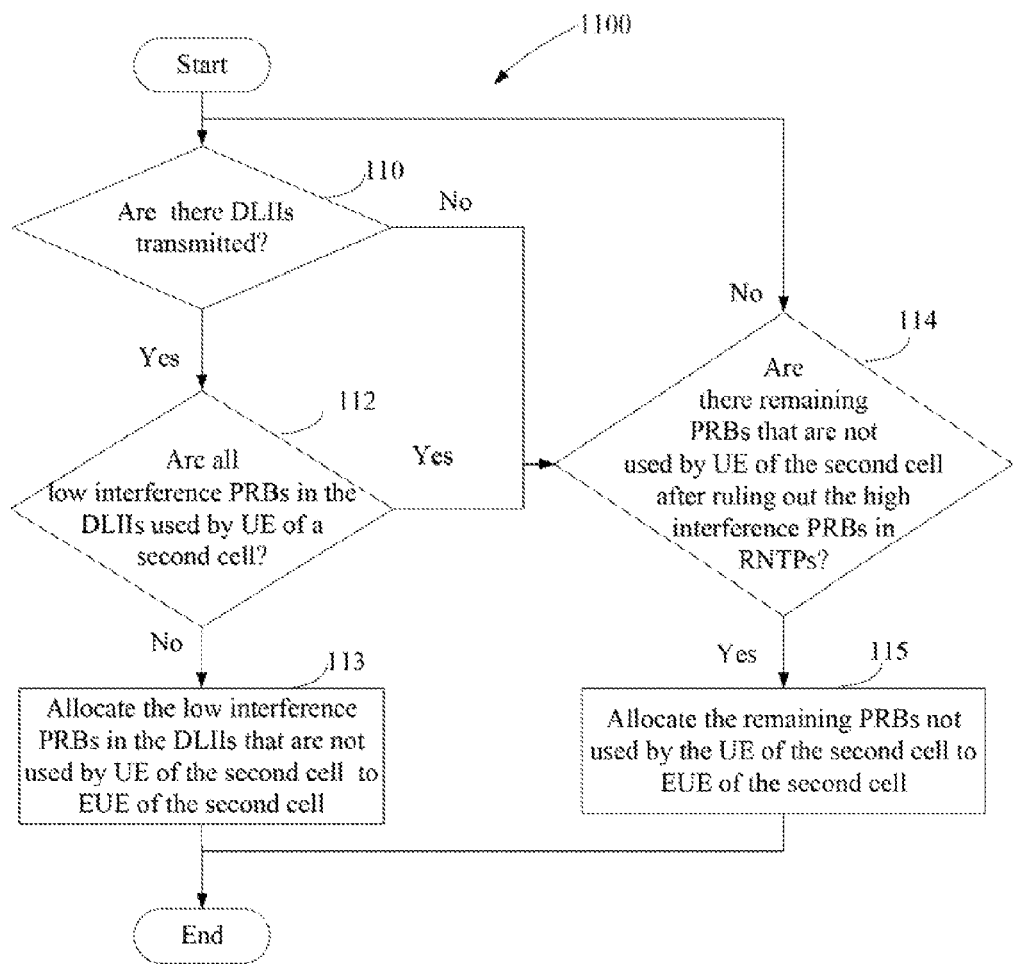
FIG. 11 illustrates a flowchart of one embodiment of a method for reducing inter-cell interference for downlink transmission.

The details of the at least one processor 26 executes the computerized codes to perform functions of the function modules can be described in the following flowchart, as shown in FIG. 6 and FIG. 11.

Referring to FIG. 6, a flowchart is presented in accordance with an example embodiment. The exemplary method 300 is provided by way of example, as there are a variety of ways to carry out the method. The exemplary method 300 described below can be carried out using the configurations illustrated in FIG. 5, for example, and various elements of these figures are referenced in explaining exemplary method 300. Each block shown in FIG. 6 represents one or more processes, methods, or subroutines, carried out in the exemplary method 300. Additionally, the illustrated order of blocks is by example only and the order of the blocks can be changed. The exemplary method 300 can begin at block 30. Depending on the embodiment, additional blocks can be added, others removed, and the ordering of the blocks can be changed.

At block 30, a detection module detects whether there are ULIIs transmitted from neighboring BSs. If the detection module detects that there are ULIIs transmitted from the neighboring BSs, process goes to block 31; if the detection module detects that there are no ULIIs transmitted from the neighboring BSs, process goes to block 33.

In some embodiments, the detection module detects whether there is a ULII transmitted from the first base station. The ULII comprises high interference PRBs and low interference PRBs. The low interference PRB in the ULII is PRB5 that the first base station allocates to UE5 (CUE) of the first cell.

At block 31, a determination module determines whether the low interference PRBs in the ULIIs are all used by UE of the second cell. If a determination is made that the low interference PRBs in the ULIIs are not all used by the UE of the second cell, process goes to block 32; if a determination is made that the low interference PRBs in the ULIIs are all used by the UE of the second cell, process goes to block 33.

The low interference PRB in the ULII transmitted from the first base station is PRB5. In one embodiment, if the PRB5 is used by UE of the second cell, the determination module determines that the low interference PRBs in the ULIIs are all used by the UE of the second cell. In another embodiment, if the PRB5 is not used by UE of the second cell. The determination module determines that the low interference PRBs in the ULIIs are not all used by the UE of the second cell. The UE of the second cell comprises CUE and EUE.

At block 32, an allocation module allocates the low interference PRBs in the ULIIs that are not used by the UE of the second cell to the EUE of the second cell.

At block 33, a determination module detects whether there are remaining PRBs that are not used by UE of the second cell, after ruling out the high interference PRBs in the HIIs, with a condition of that the detection module does not detect the ULIIs transmitted from the neighboring BSs, or the detection module has detected the ULIIs but the low interference PRBs in the ULIIs are all used by the UE of the second cell. If there are remaining PRBs not used by UE of the second cell, process goes to block 34; If there are not remaining PRBs not used by UE of the second cell, process returns to block 30.

The HIIs comprises high interference PRBs and low interference PRBs.

In a first embodiment, the detection module does not detect a ULII transmitted from the first base station, but detects a HII transmitted from the first base station. High interference PRBs in the HII are PRB1 and PRB3 (shown in FIG. 1). The determination module rules out the PRB1 and PRB3 in the HII first, then detects whether there are remaining PRBs that are not used by UE of the second cell.

In a second embodiment, the detection module detects a ULII and a HII transmitted from the first base station. High interference PRBs in the HII are PRB1 and PRB3 (shown in FIG. 1). Low interference PRB in the ULII is PRB5 (shown in FIG. 3). The determination module determines that the PRB5 is used and rules out PRB1 and PRB3 in the HII, then detects whether there are remaining PRBs that are not used by UE of the second cell.

In block 34, an allocation module allocates the remaining PRBs not used by the UE of the second cell to the EUE of the second cell after ruling out the high interference PRBs in the HIIs.

In some embodiments, as described above, the PRB5 is a low interference PRB in the ULII, and is not used by UE of the second cell. The allocation module allocates the PRB5 to the EUE (e.g. UE3 or UE4 in FIG. 3) of the second cell.

Figure 7:
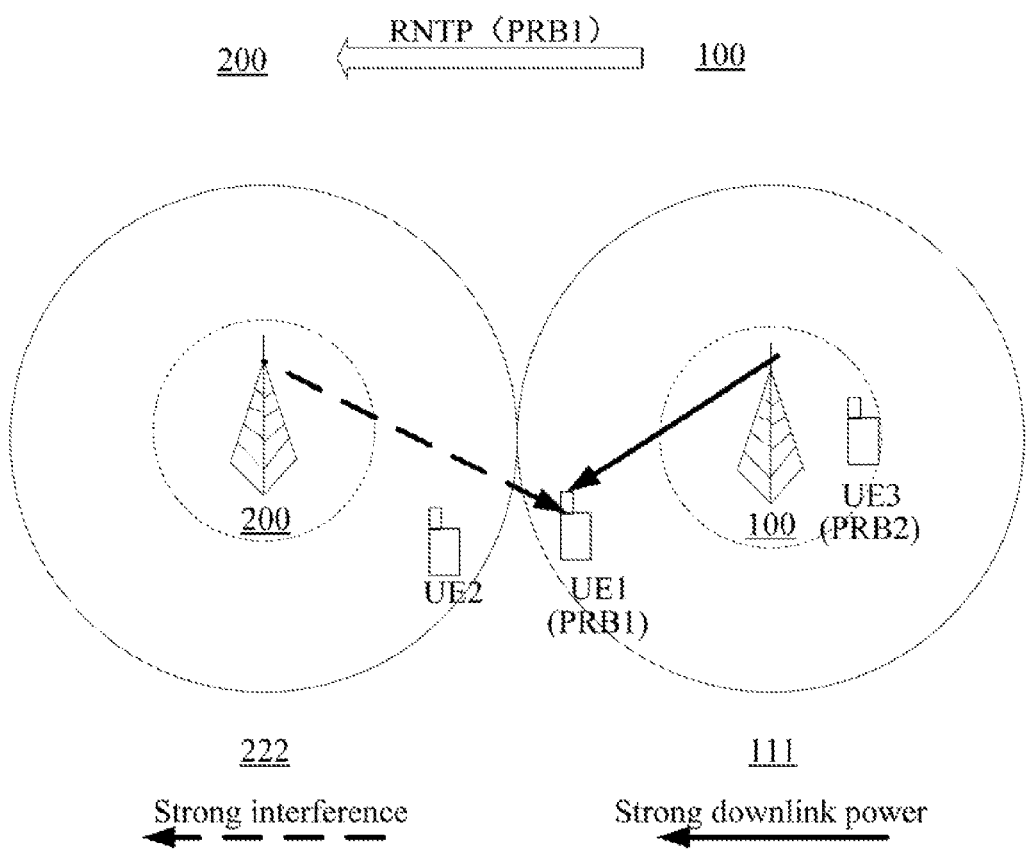
FIG. 7 illustrates one embodiment of usage of a relative narrowband transmission power message for downlink transmission in the conventional art.

FIG. 7 illustrates one embodiment of usage of a relative narrowband transmission power message for downlink transmission in the conventional art.

In some embodiments, LTE can define a relative narrowband transmission power (hereinafter referred to as RNTP) message to prevent the occurrence of inter-cell interference for downlink transmission. When a BS allocates PRBs to EUE, the BS transmits an RNTP message to its neighboring BSs via the X2 interface. That is to say, the EUE of the BS may produce high interference to EUE of the neighboring BSs. When the neighboring BSs receive the RNTP message, to prevent degradation of throughputs, the neighboring BSs avoid allocating the PRBs which are allocated to the EUE of the BS to the EUE of the neighboring BSs.

As shown in FIG. 7, the first base station 100 can established a communication with the UE1 and allocate PRB1 to the UE1 according to a request for downlink transmission from the UE1. The first base station 100 can established a communication with the UE3 and allocate PRB2 to the UE3 according to a request for downlink transmission from the UE3. Wherein the UE1 can be EUE of the first cell 111 and the UE3 can be CUE of the first cell 111. The first base station 100 can transmit an RNTP message to neighboring BSs, for example, the second base station 200. The RNTP message indicates levels of interference imposed by the PRBs allocated by the first base station 100 on the second base station 200. In some embodiments, the levels of interference imposed by the first base station 100 on the second base station 200 can be transmitted in a form of a bit map. In at least one embodiment as shown in FIG. 8, the levels of interference can be indicated by item values in a list of the RNTP message information, for example, 1 and 0, which respectively represents high interference and low interference. That is to say, the item value 1 indicates that the corresponding PRB in the RNTP message is a high interference PRB, while the item value 0 indicates that the corresponding PRB in the RNTP message is a low interference PRB. The high interference PRBs in the RNTP messages are the PRBs that are allocated to EUE of the first cell 111 by the first base station 100 for downlink transmission. In some embodiments, the first base station 100 updates the RNTP message information periodically.

Take an example, the first base station 100 allocates PRB1, PRB2, PRB3, PRB4 and PRB5 to the UE of the first cell 111. PRB1 is used by UE1 (UE1 is EUE in FIG. 7), PRB2 is used by UE3 (UE3 is CUE in FIG. 7). The item value of PRB1 in the RNTP message is 1 which indicates that the PRB1 is a high interference PRB in the RNTP message, and the item values of PRB2-PRB5 in the RNTP message are 0 which indicate that the PRB2-PRB5 are low interference PRBs in the RNTP message. When the second base station 200 receives the RNTP message from the first base station 100, the second base station 200 prevents allocating PRB1 to EUE (e.g. UE2 in FIG. 7) of the second cell 222.

Figure 9:
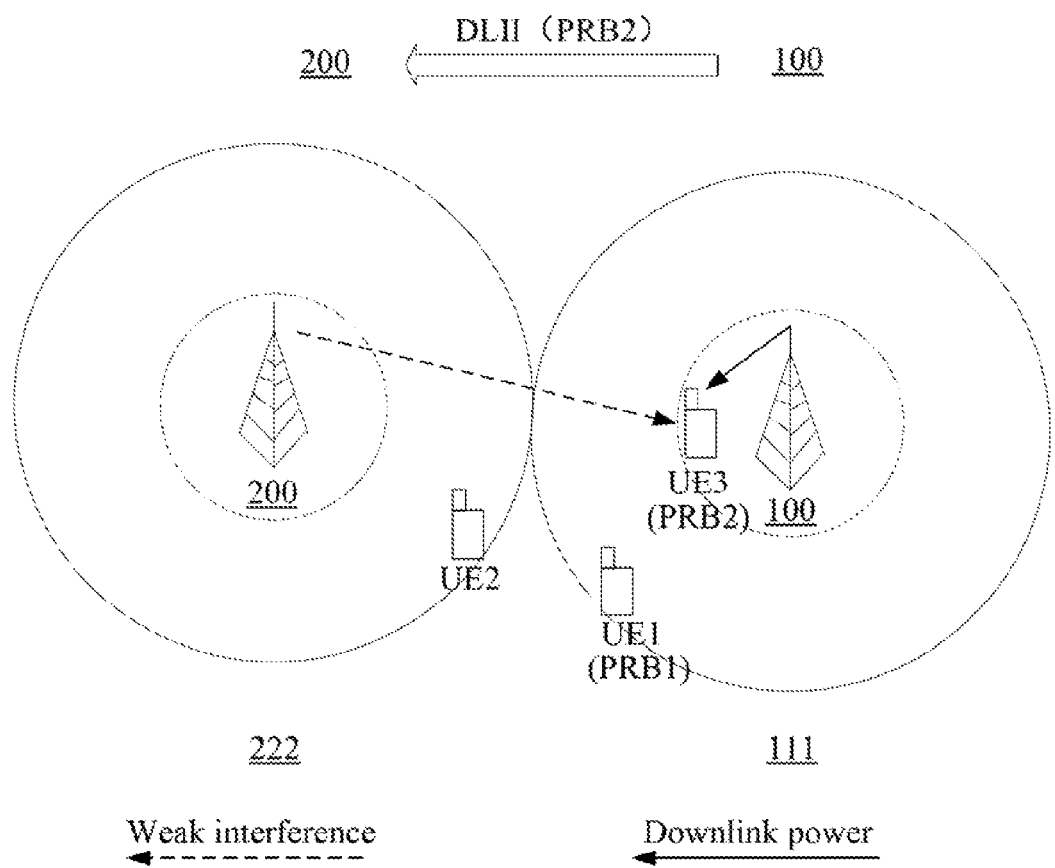
FIG. 9 illustrates one embodiment of usage of a low interference indicator for downlink transmission.

FIG. 9 illustrates one embodiment of usage of a low interference indicator for downlink transmission.

In at least one embodiment, the first base station 100 can established a communication with the UE1 and allocate PRB1 to the UE1 according to a request for downlink transmission from the UE1. The first base station 100 can established a communication with the UE3 and allocate PRB2 to the UE3 according to a request for downlink transmission from the UE3. The first base station 100 can transmit a downlink low interference indicator (hereinafter referred to as ULII) to neighboring BSs, for example, the second base station 200, via the X2 interface.

In at least one embodiment, the ULII indicates the levels of interference imposed by signal strength of downlink transmission of the CUE and the EUE of the first cell 111 on the UE of the second cell 222. Since the CUE of the first cell 111 is far from the UE of the second cell 222, the downlink power from the BS 100 to the CUE of the first cell 111 imposes a low interference on UE of the second cell 222. On the other hand, the EUE of the first cell 111 are closer to the second cell 222 than the CUE of the first cell 111 is. Therefore, the downlink power from the BS 100 to the EUE of the first cell 111 imposes a high interference on UE of the second cell 222. Based on the observation, the CUE of the first cell 111 causes low interference, and the EUE of the first cell 111 causes high interference.

In some embodiments, the DLII from the first base station 100 to the second base station 200 can be transmitted in a form of a bit map. In at least one embodiment as shown in FIG. 10, the levels of interference can be indicated by item values in a list of DLII information, for example, 1 and 0, which respectively represents low interference and high interference. That is to say, the item value 1 indicates that the corresponding PRB in the DLII is a low interference PRB, while the item value 0 indicates that the corresponding PRB in the DLII is a high interference PRB. The low interference PRBs in the DLII are the PRBs that are allocated to the CUE of the first cell 111 by the first base station 100 for downlink transmission. In some embodiments, the first base station 100 updates the DLII information periodically.

Take an example, the first base station 100 allocates PRB1, PRB2, PRB3, PRB4 and PRB5 to the UE of the first cell 111. PRB2 is used by UE3 (a CUE shown in FIG. 9). The item values of PRB1, and PRB3-PRB5 are 0 which indicate that the PRB1, and PRB3-PRB5 are high interference PRBs in the DLII. The item value of PRB2 is 1 which indicates that the PRB2 is a low interference PRB in the DLII. When the second base station 200 receives the DLII from the first base station 100, based on the DLII, the second base station 200 may directly allocate PRB2 to EUE (e.g. UE2) of the second cell 222. The PRB2 allocated to UE2 in the second cell 222 has no impact on the UE3 of the first cell 111.

Referring to FIG. 11, a flowchart is presented in accordance with an example embodiment. The exemplary method 1100 is provided by way of example, as there are a variety of ways to carry out the method. The exemplary method 1100 described below can be carried out using the configurations illustrated in FIG. 5, for example, and various elements of these figures are referenced in explaining exemplary method 1100. Each block shown in FIG. 11 represents one or more processes, methods, or subroutines, carried out in the exemplary method 1100. Additionally, the illustrated order of blocks is by example only and the order of the blocks can be changed. The exemplary method 1100 can begin at block 110. Depending on the embodiment, additional blocks can be added, others removed, and the ordering of the blocks can be changed.

At block 110, a detection module detects whether there are DLIIs transmitted from neighboring BSs. If the detection module detects that there are DLIIs transmitted from the neighboring BSs, process goes to block 112; if the detection module detects that there are no DLIIs transmitted from the neighboring BSs, process goes to block 113.

In some embodiments, the detection module can detect whether there is a DLII transmitted from the first base station. The DLII comprises high interference PRBs and low interference PRBs. The low interference PRBs in the DLII is PRB2 that the first base station allocates to CUE of the first cell.

At block 112, a determination module determines whether the low interference PRBs in the DLIIs are all used by UE of the second cell. If a determination is made that the low interference PRBs in the DLIIs are not all used by the UE of the second cell, process goes to block 113; if a determination is made that the low interference PRBs in the DLIIs are all used by the UE of the second cell, process goes to block 114.

The low interference PRB in the DLII is PRB2. In one embodiment, if the PRB2 is used by UE of the second cell, the determination module determines that the low interference PRB in the DLIIs are all used by the UE of the second cell. In another embodiment, if the PRB2 is not used by UE of the second cell. The determination module determines that the low interference PRBs in the DLIIs are not all used by the UE of the second cell. The UE of the second cell comprises CUE and EUE.

At block 113, an allocation module allocates the low interference PRBs in the DLIIs that are not used by the UE of the second cell to the EUE of the second cell.

At block 114, a determination module detects whether there are remaining PRBs that are not used by UE of the second cell, after ruling out the high interference PRBs in the RNTP messages, with a condition of that the detection module does not detect the DLIIs transmitted from the neighboring BSs, or the detection module has detected the DLIIs but the low interference PRBs in the DLIIs are all used by the UE of the second cell. If there are remaining PRBs not used by UE of the second cell, process goes to block 115; If there are not remaining PRBs not used by UE of the second cell, process returns to block 110.

The RNTP messages comprises high interference PRBs and low interference PRBs.

In some embodiments, if the detection module detects the DLII information in which the low interfere PRB is the PRB2, moreover, if the determination module determines the PRB2 in the DLII that are not used by UE of the second cell, the allocation module allocates the PRB2 in the DLII to the EUE of the second cell.

In block 115, an allocation module allocates the remaining PRBs not used by the UE of the second cell to the EUE of the second cell after ruling out the high interference PRBs in the RNTP messages.

In some embodiments, as described above, the PRB2 is a low interference PRB in the DLII, and is not used by UE of the second cell. The allocation module allocates the PRB2 to the EUE (e.g. UE2 in FIG. 9) of the second cell.

In the above embodiments, the ULII and the DLII can be known as the low interference indicator (LII). That is to say, the LII can be ULII or DLII.

In another embodiment, the first base station incorporates the ULII information and the DLII information for the LII information and transmits the LII information to the neighboring BSs. The LII information includes the ULII information and the DLII information. That is to say, the LII information includes low interference PRBs for uplink transmission and low interference PRBs for downlink transmission. The LII replaces the aforementioned ULII and DLII.

Long Term Evolution is presented in accordance with an example embodiment. The present disclosure can be applied in other similar LTE mobile communication system, such as other mobile communication system set by 3GPP.

In closing, the present disclosure does not need overload indicator (OI) information, but only a low interference indicator, a high interference indicator and a relative narrowband transmission power. The present disclosure can coordinate the problem of inter-cell interference for uplink transmission based on the low interference indicator and the high interference indicator, and coordinate the problem of inter-cell interference for downlink transmission based on the low interference indicator and the relative narrowband transmission power.

It should be emphasized that the above-described embodiments of the present disclosure, and of any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A base station for reducing inter-cell interference, comprising:
at least one processor; and
a non-transitory storage device storing one or more programs which, when executed by the at least one processor, cause the at least one processor to:
detect low interference indicators (LIIs), wherein the LIIs comprise low interference physical resource blocks (PRBs); and
allocate the low interference PRBs in the LIIs that are not used by user equipment (UE) of a cell served by the base station (served cell) to cell edge UE of the served cell;
wherein the low interference PRBs in the LIIs comprise PRBs that are allocated to cell center UE of a neighboring cell by a neighboring station for downlink transmission, and the one or more programs further cause the at least one processor to:
for downlink transmission, when the LIIs are not detected, or when the LIIs are detected but the low interference PRBs in the LIIs are all used by the UE of the served cell, allocate remaining PRBs that are not used by the UE of the served cell to cell edge UE of the served cell after ruling out high interference PRBs in relative narrowband transmission power (RNTP) messages.

2. The base station according to claim 1, wherein the low interference PRBs in the LIIs comprise PRBs that are allocated to cell center UE of a neighboring cell served by a neighboring station for uplink transmission, and the one or more programs further cause the at least one processor to:
for uplink transmission, when the LIIs are not detected, or when the LIIs are detected but the low interference PRBs in the LIIs are all used by the UE of the served cell, allocate remaining PRBs that are not used by the UE of the served cell to cell edge UE of the served cell after ruling out high interference PRBs in high interference indicators (HIIs).

3. The base station according to claim 2, wherein the high interference PRBs in the HIIs are PRBs allocated to cell edge UE of the neighboring cell by the neighboring station for uplink transmission.

4. The base station according to claim 1, wherein the high interference PRBs in the RNTP messages are PRBs allocated to cell edge UE of the neighboring cell by the neighboring station for downlink transmission.

5. A method for reducing inter-cell interference, executable on a base station having at least one processor and a non-transitory storage device, comprising:
detecting, by the at least one processor, low interference indicators (LIIs), wherein the LIIs comprise low interference physical resource blocks (PRBs); and
allocating, using the at least one processor, the low interference PRBs in the LIIs that are not used by user equipment (UE) of a cell served by the base station (served cell) to cell edge UE of the served cell;
wherein the low interference PRBs in the LIIs comprising PRBs that are allocated to cell center UE of a neighboring cell by a neighboring station for downlink transmission, the method further comprising:
for downlink transmission, when the LIIs are not detected, or when the LIIs are detected but the low interference PRBs in the LIIs are all used by the UE of the served cell, the at least one processor allocating remaining PRBs that are not used by the UE of the served cell to cell edge UE of the served cell after ruling out high interference PRBs in relative narrowband transmission power (RNTP) messages.

6. The method according to claim 5, wherein the low interference PRBs in the LIIs comprise PRBs that are allocated to cell center UE of a neighboring cell by a neighboring station for uplink transmission, the method further comprising:
for uplink transmission, when the LIIs are not detected, or when the LIIs are detected but the low interference PRBs in the LIIs are all used by the UE of the served cell, the at least one processor allocating remaining PRBs that are not used by the UE of the served cell to cell edge UE of the served cell after ruling out high interference PRBs in high interference indicators (HIIs).

7. The method according to claim 6, wherein the high interference PRBs in the HIIs are PRBs allocated to cell edge UE of the neighboring cell by the neighboring station for uplink transmission.

8. The method according to claim 5, wherein the high interference PRBs in the RNTP messages are PRBs allocated to cell edge UE of the neighboring cell by the neighboring station for downlink transmission.

9. A system for reducing inter-cell interference, executable on a base station, comprising:
- a detection module detecting low interference indicators (LIIs), wherein the LIIs comprise low interference physic resource blocks (PRBs); and
- an allocation module allocating the low interference PRBs in the LIIs that are not used by user equipment (UE) of a cell served by the base station to cell edge UE of the served cell;
- wherein the low interference PRBs in the LIIs comprise PRBs that are allocated to cell center UE of a neighboring cell by a neighboring station for downlink transmission, wherein the allocation module further:
- for downlink transmission, when the LIIs are not detected, or when the LIIs are detected but the low interference PRBs in the LIIs are all used by the UE of the served cell, allocate remaining PRBs that are not used by the UE of the served cell to cell edge UE of the served cell after ruling out high interference PRBs in relative narrowband transmission power (RNTP) messages.

* * * * *